US012567237B2

(12) United States Patent
Xu et al.

(10) Patent No.: US 12,567,237 B2
(45) Date of Patent: Mar. 3, 2026

(54) OBJECT EVALUATION METHOD, OBJECT EVALUATION DEVICE, NON-TRANSITORY COMPUTER-READABLE STORAGE MEDIUM, AND COMPUTER PROGRAM PRODUCT

(71) Applicant: Hangzhou Ruisheng Software Co., Ltd., Zhejiang (CN)

(72) Inventors: Qingsong Xu, Zhejiang (CN); Tao He, Zhejiang (CN); Liang Li, Zhejiang (CN)

(73) Assignee: Hangzhou Ruisheng Software Co., Ltd., Zhejiang (CN)

( * ) Notice: Subject to any disclaimer, the term of this patent is extended or adjusted under 35 U.S.C. 154(b) by 0 days.

(21) Appl. No.: 19/292,827

(22) Filed: Aug. 6, 2025

(65) Prior Publication Data

US 2025/0363778 A1 Nov. 27, 2025

Related U.S. Application Data

(63) Continuation of application No. PCT/CN2024/075701, filed on Feb. 4, 2024.

(30) Foreign Application Priority Data

Feb. 17, 2023 (CN) .......................... 202310179301.4

(51) Int. Cl.
*G06V 10/764* (2022.01)
*G06T 7/00* (2017.01)
(Continued)

(52) U.S. Cl.
CPC ............ *G06V 10/764* (2022.01); *G06T 7/001* (2013.01); *G06V 10/761* (2022.01);
(Continued)

(58) Field of Classification Search
CPC .. G06V 10/764; G06V 10/761; G06V 10/774; G06V 10/82; G06V 20/66;
(Continued)

(56) References Cited

U.S. PATENT DOCUMENTS 8,605,969 B2 * 12/2013 Sofka ................... A61B 8/0816
382/128
11,508,188 B2 * 11/2022 Lee ........................ G06V 40/45
(Continued)

FOREIGN PATENT DOCUMENTS

CN 116206310 6/2023
WO 2023019098 2/2023

OTHER PUBLICATIONS

"International Search Report (Form PCT/ISA/210) of PCT/CN2024/075701", mailed on Apr. 25, 2024, with English translation thereof, pp. 1-4.
(Continued)

*Primary Examiner* — Carol W Chan
(74) *Attorney, Agent, or Firm* — JCIPRNET

(57) ABSTRACT

An object evaluation method and an object evaluation device. The object evaluation method includes: obtaining an image of a first object to be evaluated; determining first level information by means of a first object level classifier according to the image of the first object to be evaluated; determining adjustment weights of various object levels according to distribution proportions of the object images of the various object levels in a plurality of object images having the same object type as that of the image of first object to be evaluated and having known object levels, wherein an object level having a relatively high distribution proportion has a relatively low adjustment weight; and respectively generating second rating confidences of the various object levels according to first rating confidences and the adjustment
(Continued)

Obtaining an image of a first object to be evaluated — S100

Determining first level information according to the image of the first object to be evaluated through a first object level classifier — S200

Determining adjustment weights of the various object levels according to distribution proportions of object images of the various object levels in a plurality of object images having a same object type as that of the image of the first object to be evaluated and having known object levels — S310

Generating second rating confidences of the various object levels respectively according to the first rating confidences and the adjustment weights of the various object levels to form second level information — S320 weights of the various object levels to form second level information.

21 Claims, 5 Drawing Sheets

(51) Int. Cl.
| | |
|---|---|
| *G06V 10/74* | (2022.01) |
| *G06V 10/774* | (2022.01) |
| *G06V 10/82* | (2022.01) |
| *G06V 20/66* | (2022.01) |
| *G06V 20/80* | (2022.01) |

(52) U.S. Cl.
CPC ............ *G06V 10/774* (2022.01); *G06V 10/82* (2022.01); *G06V 20/66* (2022.01); *G06V 20/80* (2022.01); *G06T 2207/20081* (2013.01); *G06T 2207/20084* (2013.01)

(58) Field of Classification Search
CPC .................... G06V 20/80; G06T 7/001; G06T 2207/20081; G06T 2207/20084
See application file for complete search history.

(56) References Cited

U.S. PATENT DOCUMENTS

| | | | |
|---|---|---|---|
| 2017/0345196 A1* | 11/2017 | Tanaka | .................... G06T 11/60 |
| 2021/0073563 A1* | 3/2021 | Karianakis | ........... G06V 40/103 |
| 2022/0036371 A1 | 2/2022 | Frisbee et al. | |
| 2022/0261984 A1 | 8/2022 | Shalamberidze et al. | |
| 2022/0343483 A1 | 10/2022 | Desai | |

OTHER PUBLICATIONS

"Written Opinion of the International Searching Authority (Form PCT/ISA/237) of PCT/CN2024/075701", mailed on Apr. 25, 2024, pp. 1-4.

* cited by examiner

Obtaining an image of a first object to be evaluated     S100

Determining first level information according to the image of the first object to be evaluated through a first object level classifier     S200

Determining adjustment weights of the various object levels according to distribution proportions of object images of the various object levels in a plurality of object images having a same object type as that of the image of the first object to be evaluated and having known object levels     S310

Generating second rating confidences of the various object levels respectively according to the first rating confidences and the adjustment weights of the various object levels to form second level information     S320

FIG. 2

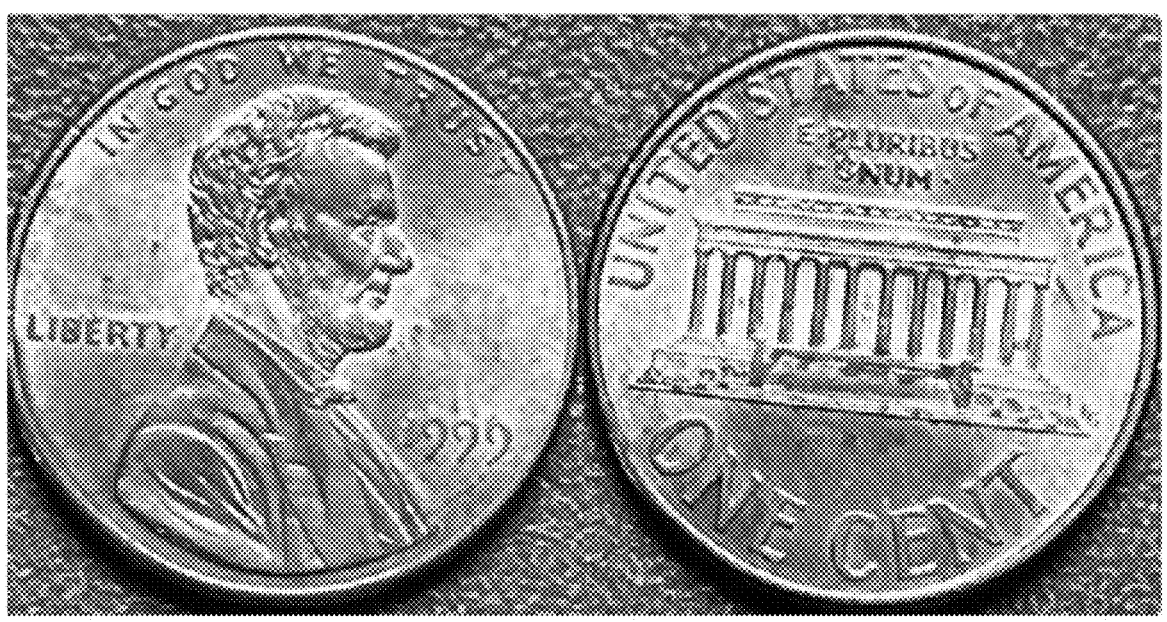

FIG. 3

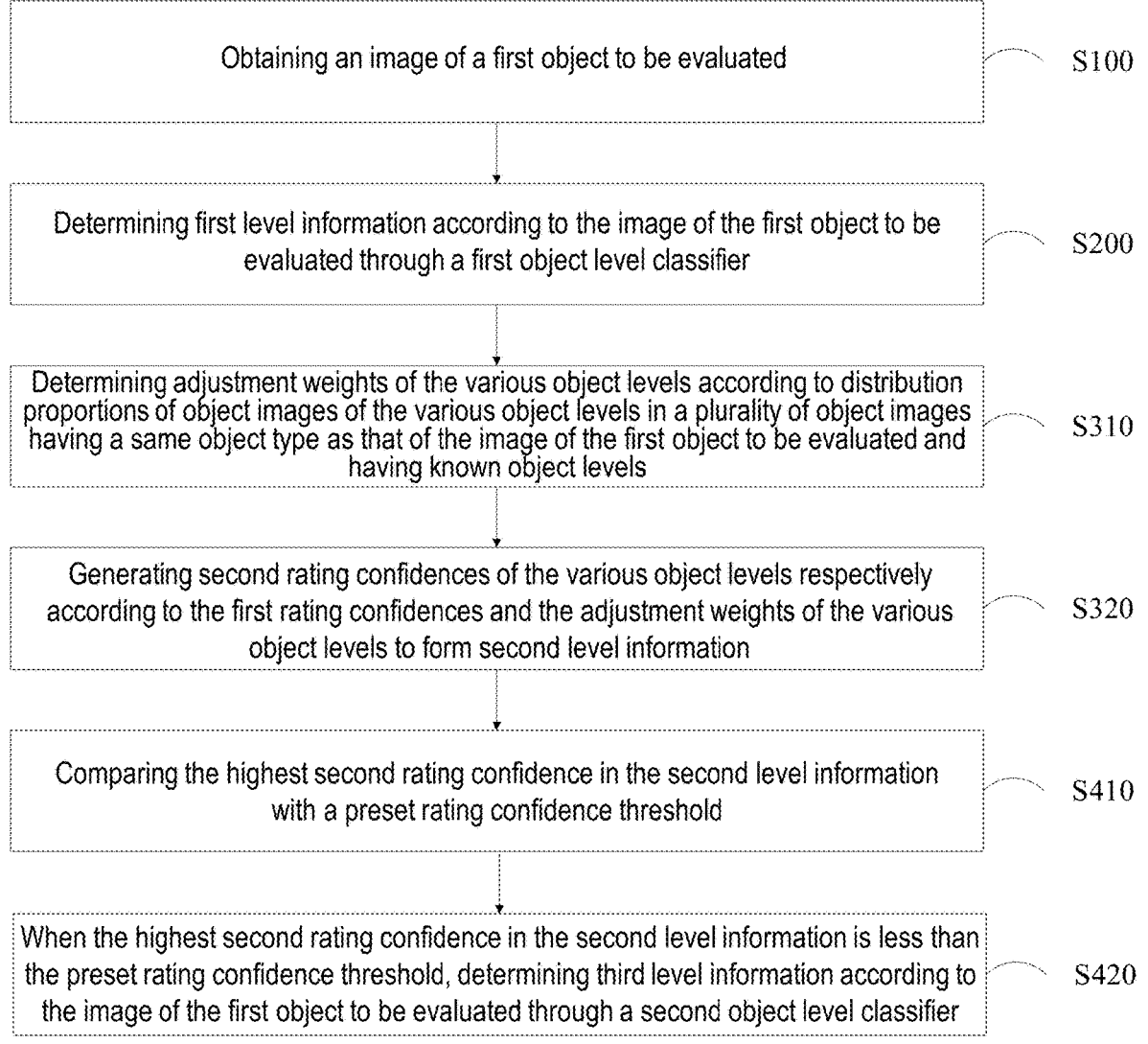

Obtaining an image of a first object to be evaluated    S100

Determining first level information according to the image of the first object to be evaluated through a first object level classifier    S200

Determining adjustment weights of the various object levels according to distribution proportions of object images of the various object levels in a plurality of object images having a same object type as that of the image of the first object to be evaluated and having known object levels    S310

Generating second rating confidences of the various object levels respectively according to the first rating confidences and the adjustment weights of the various object levels to form second level information    S320

Comparing the highest second rating confidence in the second level information with a preset rating confidence threshold    S410

When the highest second rating confidence in the second level information is less than the preset rating confidence threshold, determining third level information according to the image of the first object to be evaluated through a second object level classifier    S420

FIG. 6

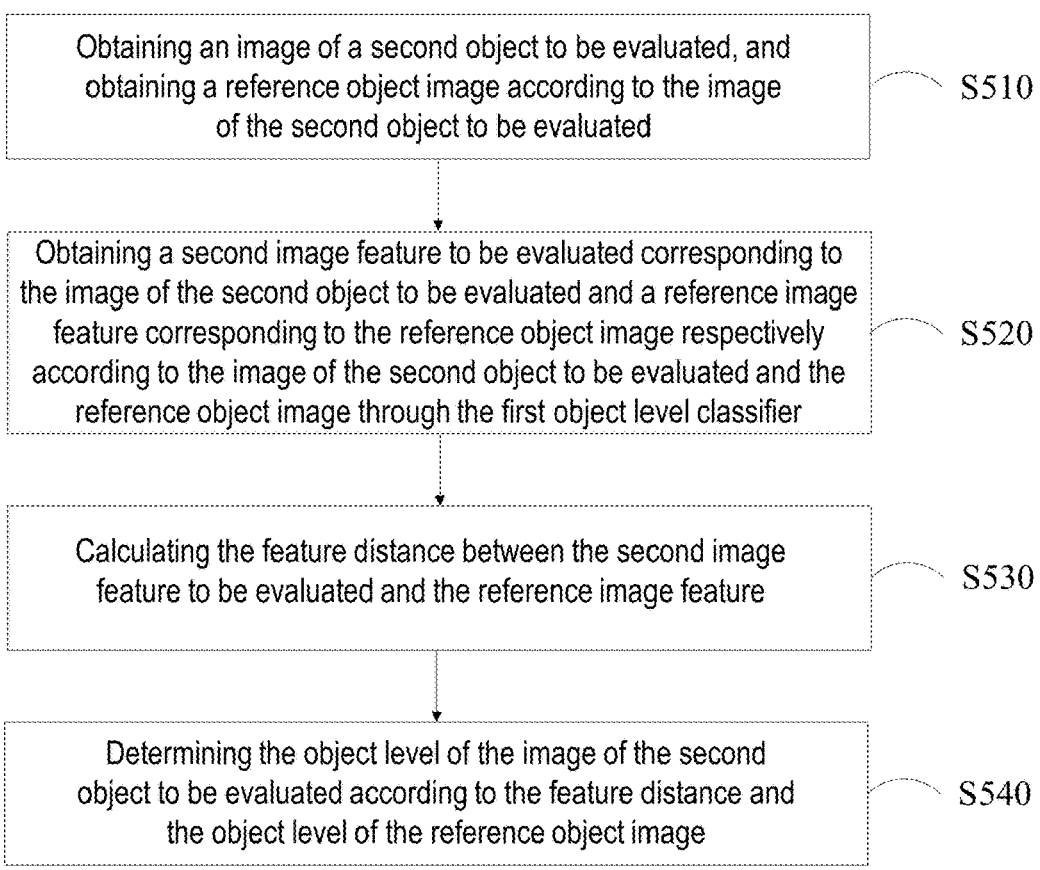

| Obtaining an image of a second object to be evaluated, and obtaining a reference object image according to the image of the second object to be evaluated | S510 |

| Obtaining a second image feature to be evaluated corresponding to the image of the second object to be evaluated and a reference image feature corresponding to the reference object image respectively according to the image of the second object to be evaluated and the reference object image through the first object level classifier | S520 |

| Calculating the feature distance between the second image feature to be evaluated and the reference image feature | S530 |

| Determining the object level of the image of the second object to be evaluated according to the feature distance and the object level of the reference object image | S540 |

FIG. 7

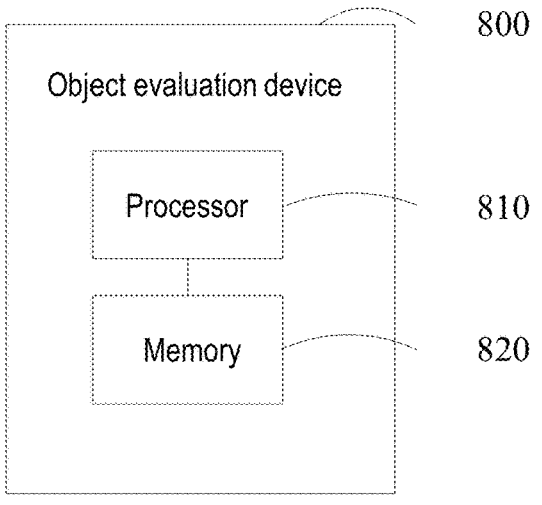

Object evaluation device — 800

Processor — 810

Memory — 820

FIG. 8

OBJECT EVALUATION METHOD, OBJECT EVALUATION DEVICE, NON-TRANSITORY COMPUTER-READABLE STORAGE MEDIUM, AND COMPUTER PROGRAM PRODUCT

CROSS-REFERENCE TO RELATED APPLICATION

This application is a continuation of international application of PCT application serial no. PCT/CN2024/075701 filed on Feb. 4, 2024, which claims the priority benefit of China application no. 202310179301.4 filed on Feb. 17, 2023. The entirety of each of the above-mentioned patent applications is hereby incorporated by reference herein and made a part of this specification.

TECHNICAL FIELD

The present disclosure relates to the field of computer technology, and specifically relates to an object evaluation method and an object evaluation device.

DESCRIPTION OF RELATED ART

With the increasing enrichment of cultural life, coins, badges, tickets, and the like are being circulated or collected in greater quantities. In the circulation or collection process, there is a need to evaluate the condition of the above-mentioned objects. In some circumstances, such evaluation may be conducted by professional institutions or professionals, but the evaluation method typically requires some expenses, and the expenses may be relatively high. Moreover, such evaluation methodology exhibits inherent subjective elements. In other circumstances, automatic evaluation of the objects may also be performed through computer models. However, due to some issues with the data currently utilized for constructing computer models, for example, there is an abundance of data pertaining to higher-level objects while there is a lack of data concerning lower-level objects, the evaluation accuracy and reliability of existing computer models remain deficient to some extent. Therefore, it is necessary to improve the evaluation methods for such objects.

SUMMARY OF DISCLOSURE

One of the purposes of the present disclosure is to provide an object evaluation method and an object evaluation device.

According to a first aspect of the present disclosure, an object evaluation method is provided, including:

Obtaining an image of a first object to be evaluated;

Determining first level information by means of a first object level classifier according to the image of the first object to be evaluated, wherein the first object level classifier is directed at an object type of the image of the first object to be evaluated and is obtained based on neural network training, and the first level information includes a first rating confidence that the image of the first object to be evaluated is determined as various object levels;

Determining adjustment weights of the various object levels according to distribution proportions of object images of the various object levels in a plurality of object images having a same object type as that of the image of the first object to be evaluated and having known object levels, wherein an object level having a relatively high distribution proportion has a relatively low adjustment weight; and Generating second rating confidences of the various object levels respectively according to the first rating confidences and the adjustment weights of the various object levels to form second level information.

In some embodiments, obtaining the image of the first object to be evaluated includes:

Obtaining an original image of the first object to be evaluated; and

Performing coordinate transformation on the original image of the first object to be evaluated to generate an expanded image of the first object to be evaluated, and using the expanded image as the image of the first object to be evaluated, wherein an outer contour of the image of the first object to be evaluated is rectangular.

In some embodiments, obtaining the image of the first object to be evaluated further includes:

Before performing the coordinate transformation on the original image of the first object to be evaluated, performing calibration preprocessing on the original image of the first object to be evaluated.

In some embodiments, performing the coordinate transformation on the original image of the first object to be evaluated to generate the expanded image of the first object to be evaluated includes performing the coordinate transformation based on the following formula:

$$x1 = r1\cos\theta1,$$
$$y1 = r1\sin\theta1,$$
$$x1^2 + y1^2 = r1^2,$$
$$\frac{y1}{x1} = \tan\theta1,$$

Wherein, $(r1, \theta1)$ are polar coordinates of any point A on the original image of the first object to be evaluated before the coordinate transformation, $(x1, y1)$ are rectangular coordinates of a point A' corresponding to the point A on the expanded image of the first object to be evaluated after the coordinate transformation.

In some embodiments, the first object level classifier is trained based on a deep convolutional neural network by utilizing a cross-entropy loss function and a stochastic gradient descent algorithm.

In some embodiments, among the plurality of object images having the same object type as that of the image of the first object to be evaluated and having the known object levels, if a distribution proportion of an object image of an i-th object level among the plurality of object images is pi, then an adjustment weight qi of the i-th object level satisfies $qi=(1/pi)^a$, wherein, $0 < a < 1$.

In some embodiments, a=0.5.

In some embodiments, if there are a total of N object levels, and first object level information is represented as (c1, c2, . . . , ci, . . . , cN), then second object level information is represented as (c1*p1, c2*p2, . . . , ci* pi, . . . , cN*pN), wherein, ci is a first rating confidence of the i-th object level, ci*pi is a second rating confidence of the i-th object level.

In some embodiments, the object evaluation method further includes:

Taking an object level having the highest second rating confidence as an object level of the image of the first object to be evaluated.

In some embodiments, the object evaluation method further includes:

Determining the object type according to the image of the first object to be evaluated through an object type classifier, wherein the object type classifier is obtained based on the neural network training.

In some embodiments, the object evaluation method further includes:

Comparing the highest second rating confidence in the second level information with a preset rating confidence threshold;

When the highest second rating confidence in the second level information is less than the preset rating confidence threshold, third level information is determined according to the image of the first object to be evaluated through a second object level classifier, wherein the second object level classifier is independent of the object type of the image of the first object to be evaluated and is obtained based on the neural network training, and the third level information includes a third rating confidence that the image of the first object to be evaluated is determined as the various object levels.

In some embodiments, the object evaluation method further includes:

Taking an object level having the highest third rating confidence as an object level of the image of the first object to be evaluated.

In some embodiments, when there are a plurality of images of the first object to be evaluated for characterizing different parts of the same first object to be evaluated, the object level of the image of the first object to be evaluated is determined according to each of the images of the first object to be evaluated respectively; and The object evaluation method further includes:

Taking the lowest object level among a plurality of object levels of the plurality of images of the first object to be evaluated as the object level of the first object to be evaluated.

In some embodiments, the respective first object level classifiers for respective object types and the second object level classifier have the same neural network structure.

In some embodiments, the object evaluation method further includes:

Obtaining an image of a second object to be evaluated, and obtaining a reference object image according to the image of the second object to be evaluated, wherein an object type of the reference object image is the same as an object type of the image of the second object to be evaluated, and the reference object image is taken as the image of the first object to be evaluated to determine an object level of a reference object;

Obtaining a second image feature to be evaluated corresponding to the image of the second object to be evaluated and a reference image feature corresponding to the reference object image according to the image of the second object to be evaluated and the reference object image respectively through the first object level classifier;

Calculating a feature distance between the second image feature to be evaluated and the reference image feature; and Determining an object level of the image of the second object to be evaluated according to the feature distance and the object level of the reference object.

In some embodiments, a part of a second object to be evaluated characterized by the image of the second object to be evaluated is determined through the object type classifier, and a part of the reference object characterized by the reference object image is the same as the part of the second object to be evaluated characterized by the image of the second object to be evaluated.

In some embodiments, the reference object image is randomly obtained from a preset reference image set having the object type of the image of the second object to be evaluated.

In some embodiments, when there are a plurality of images of the second object to be evaluated for characterizing different parts of the same second object to be evaluated, one or more corresponding reference object images are obtained according to each of the images of the second object to be evaluated respectively;

Dividing all the obtained reference object images into one or more reference object image groups, wherein the reference object images in each of the reference object image groups are used to characterize the same reference object, and the reference object images in different reference object image groups are respectively used to characterize different reference objects;

Performing the following operations on each of the reference object image groups:

Using each of the reference object images in the reference object image group as the image of the first object to be evaluated respectively to determine the object level of that reference object image, and using the lowest object level of all reference object images in the reference object image group as the object level of the reference object characterized by the reference object image group;

Obtaining a feature distance between the reference image feature of each of the reference object images in the reference object image group and the second image feature to be evaluated of the image of the corresponding second object to be evaluated;

Determining an object level of the image of the second object to be evaluated according to an average feature distance of all feature distances of the reference object image group and the object level of the reference object characterized by the reference object image group; and Using an average object level of one or more object levels determined according to the one or more reference object image groups as an object level of the second object to be evaluated.

In some embodiments, calculating the feature distance between the second image feature to be evaluated and the reference image feature includes:

Encoding the second image feature to be evaluated and the reference image feature through two fully connected layers, and using an output result obtained from the encoding as the feature distance.

In some embodiments, calculating the feature distance between the second image feature to be evaluated and the reference image feature includes:

Calculating the feature distance between the second image feature to be evaluated and the reference image feature through a similarity measurement algorithm.

In some embodiments, when the feature distance is a first feature distance, a level difference between the object level of the image of the second object to be evaluated and the object level of the reference object image is a first level difference. When the feature distance is a second feature distance, the level difference between the object level of the image of the second object to be evaluated and the object level of the reference object image is a second level difference. When the first feature distance is greater than the second feature distance, the first level difference is greater than or equal to the second level difference.

In some embodiments, the object evaluation method further includes:

For the image of the same second object to be evaluated, determining the object level of the image of the second object to be evaluated based on a plurality of object levels respectively determined according to a plurality of reference object images.

In some embodiments, an average level based on the plurality of object levels respectively determined according to the plurality of reference object images is used as the object level of the image of the second object to be evaluated.

In some embodiments, the object includes at least one of coins, badges, and tickets.

According to a second aspect of the present disclosure, an object evaluation device is provided, including a memory and a processor, wherein instructions are stored in the memory, and when the instructions are executed by the processor, the object evaluation method as described above is implemented.

According to a third aspect of the present disclosure, a computer-readable storage medium is provided, wherein instructions are stored in the computer-readable storage medium, and when the instructions are executed by a processor, the object evaluation method as described above is implemented.

According to a fourth aspect of the present disclosure, a computer program product is provided, wherein the computer program product includes instructions, and when the instructions are executed by a processor, the object evaluation method as described above is implemented.

Through the following detailed description of exemplary embodiments of the present disclosure with reference to the accompanying drawings, other features and advantages of the present disclosure will become clearer.

BRIEF DESCRIPTION OF THE DRAWINGS

The accompanying drawings, which constitute a part of the specification, describe embodiments of the present disclosure and, together with the specification, serve to explain the principles of the present disclosure.

With reference to the accompanying drawings, the present disclosure may be understood more clearly according to the following detailed description, wherein:

FIG. 2 shows a flowchart of an object evaluation method according to an exemplary embodiment of the present disclosure;

FIG. 3 shows an original image of a coin to be evaluated according to a specific example of the present disclosure;

FIG. 6 shows a flowchart of an object evaluation method according to another exemplary embodiment of the present disclosure;

FIG. 7 shows a flowchart of an object evaluation method according to yet another exemplary embodiment of the present disclosure;

FIG. 8 shows a schematic view of an object evaluation device according to an exemplary embodiment of the present disclosure.

Figure 1:
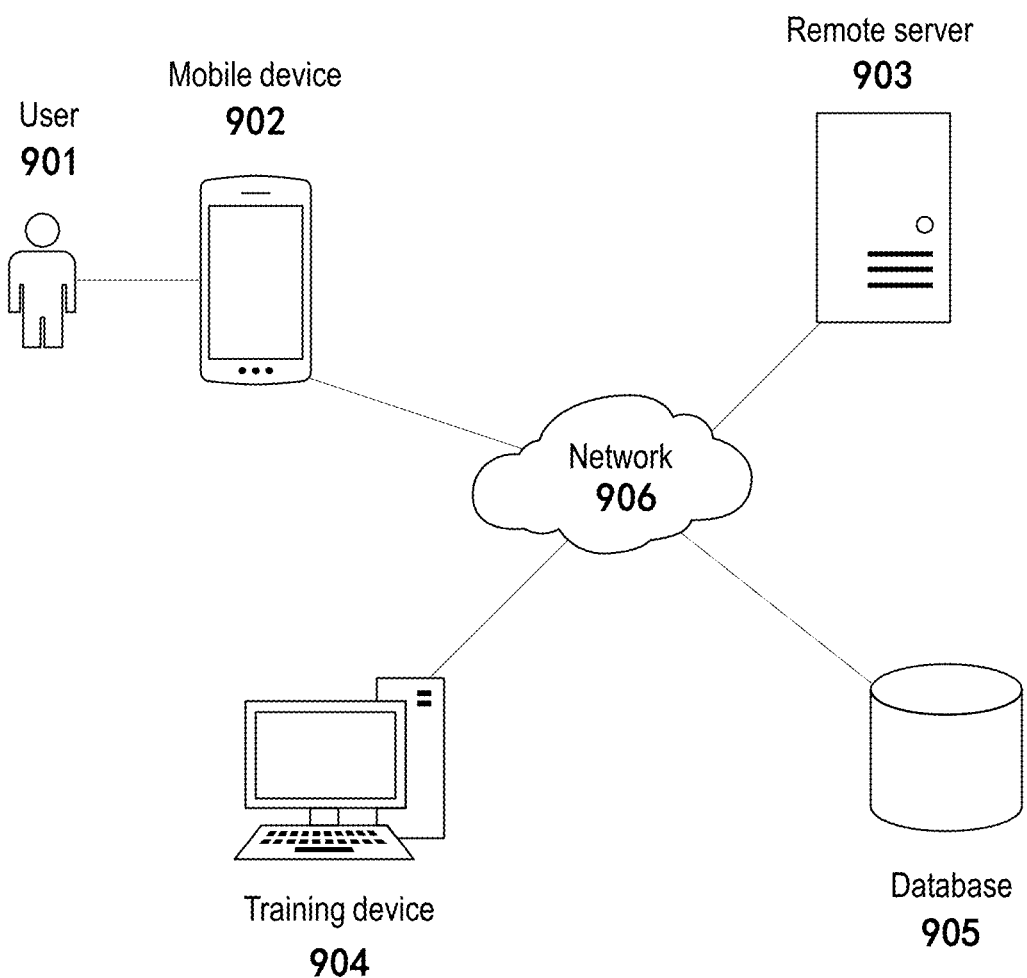
FIG. 1 shows a schematic view of a network environment according to an exemplary embodiment of the present disclosure.

Note that in the implementation methods described below, the same reference numerals are sometimes used across different drawings to denote identical parts or parts having the same function, and repetitive descriptions thereof are omitted. In some cases, similar reference numerals and characters are used to denote similar items, therefore, once an item is defined in one drawing, it need not be further discussed in subsequent drawings.

For ease of understanding, the positions, dimensions, ranges, and the like of various structures shown in the drawings and the like sometimes do not represent actual positions, dimensions, ranges, etc. Therefore, the present disclosure is not limited to the positions, dimensions, ranges, and the like disclosed in the drawings.

DESCRIPTION OF THE EMBODIMENTS

Various exemplary embodiments of the present disclosure will be described in detail below with reference to the accompanying drawings. It should be noted that unless specifically stated otherwise, the relative arrangements of parts and steps, numerical expressions, and numerical values set forth in these embodiments do not limit the scope of the present disclosure.

The following description of at least one exemplary embodiment is actually merely illustrative and in no way serves as any limitation on the present disclosure and its application or use. That is, the structures and methods herein are shown in an exemplary manner to illustrate different embodiments of the structures and methods in the present disclosure. However, those skilled in the art will understand that they merely illustrate exemplary ways in which the present disclosure may be implemented, rather than exhaustive ways. Furthermore, the drawings are not necessarily drawn to scale, and some features may be enlarged to show details of specific components.

Technologies, methods and devices known to those of ordinary skill in the relevant field may not be discussed in detail, but where appropriate, said technologies, methods and devices should be considered as part of the authorized specification.

In all examples shown and discussed herein, any specific values should be interpreted as merely exemplary, and not as limitations. Therefore, other examples of the exemplary embodiments may have different values.

With the development of machine learning technology, it is possible to evaluate the condition of objects such as coins, badges, tickets, and the like through models established based on neural networks. Herein, the evaluation of coins is taken as an example, referencing the evaluation system of Professional Coin Grading Service (PCGS), to provide a detailed exposition of the object evaluation methodology. In the evaluation system with reference to PCGS, a total of ten levels may be set for the condition of coins, from an excellent condition to a bad condition, including: an MS (mint_state) level, an AU (about_uncirculated) level, an XF (extremely_fine) level, a VF (very_fine) level, an F (fine) level, a VG (very good) level, a G (good) level, an AG (about_good) level, an FA (fair) level and a P (poor) level. The classification of these levels may use the design pattern of coins as a reference standard. Specifically, it is possible to evaluate whether the coin has been circulated according to the design pattern. If the coin has not been circulated, the coin is determined as the MS level. If the coin has been circulated, it is possible to further determine which level the coin is in according to the degree of wear marks on the coin, the clarity of key parts, defects, rust marks, etc. In some situations, for the convenience of calculating an average level according to a plurality of levels when needed, preset numerical values may also be used to represent each of the levels. When an average value of a plurality of numerical values corresponding to the plurality of levels calculated is a non-integer, the average value is rounded through rounding or other methods and so on to determine the corresponding average level. In a specific example, numerical values 10, 9, 8, 7, 6, 5, 4, 3, 2 and 1 may be used to represent the MS level, the AU level, the XF level, the VF level, the F level, the VG level, the G level, the AG level, the FA level and the P level respectively. However, it may be understood that the object evaluation method described herein may also be applied to other objects besides coins, which is not limited herein. Moreover, the object evaluation method described herein may also be based on other evaluation systems besides the evaluation system with reference to PCGS, which is not limited herein.

To establish a computer model for evaluating objects, it is necessary to train the computer model based on a pre-collected training set. In some situations, a pre-collected test set may also be used to test the accuracy and reliability of the computer model. For example, an object level classifier based on an object type may be trained separately for each object type. For this purpose, for each object type, at least it is necessary to prepare a training set formed by a plurality of object images of this type marked with object levels. For example, the training set may be obtained from external coin websites and the like to collect object images that have undergone condition identification for training. However, there are some problems with the training data that can currently be collected. Taking coins as an example, since users are more willing to spend money to identify coins with excellent condition, the distribution of training data is not at a good balance. The training data is mainly concentrated in the head (i.e., coins at a higher level), while there is very little or even a lack of training data in the tail (i.e., coins at a lower level). For example, in the training data covering all coin types, there may be 200,000 training data entries graded as the MS level, while training data graded as FA/P level may have fewer than 300 entries. When distributed across each coin type, virtually no single coin type can compile training data for all coin levels, and most coins may only have one training data entry at the MS level. When training is performed based on such a training set, the accuracy and reliability of the obtained computer model are often unsatisfactory.

To solve the above problems, the present disclosure provides an object evaluation method and an object evaluation device that improve the accuracy of evaluation at least by performing weight adjustment on level information output by the trained computer model during the evaluation process.

FIG. 1 shows a schematic view of a network environment 900 according to an exemplary embodiment of the present disclosure. The network environment 900 may include a mobile device 902, a remote server 903, a training device 904, and a database 905, which are coupled to each other wired or wirelessly through a network 906. The network 906 may be embodied as a wide area network (such as a mobile telephone network, a public switched telephone network, a satellite network, the Internet, etc.), a local area network (such as Wi-Fi, Wi-Max, ZigBee™, Bluetooth™, etc.), and/or other forms of networking functionality.

The mobile device 902 may be a mobile phone, a tablet computer, a laptop computer, a personal digital assistant, and/or other computing device configured for capturing, storing, and/or transmitting images such as digital photographs. Therefore, the mobile device 902 may include an image capturing unit such as a digital camera and/or may be configured to receive images from other devices. The mobile device 902 may include a display. The display may be configured to provide one or more user interfaces to a user 901. The user interfaces may include a plurality of interface elements with which the user 901 may interact, etc. For example, the user 901 may use the mobile device 902 to take photos of objects such as coins, badges, tickets, and the like, and upload or store object images. The mobile device 902 may output object type and object level of objects such as coins, badges, tickets, and so on to the user.

The remote server 903 (server side) may be configured to analyze object images received from the mobile device 902 through the network 906 to determine information such as level and type of the object, for example, for executing the object evaluation method as described below. The remote server 903 may also be configured to create and train at least one of the object level classifier and the object type classifier as described below.

The training device 904 may be coupled to the network 906 to facilitate training of at least one of the object level classifier and the object type classifier. The training device 904 may have a plurality of CPUs and/or GPUs to assist training.

The database 905 may be coupled to the network 906 and provide data required for the remote server 903 to perform related calculations. The database 905 may be implemented using various database technologies known in the art. The remote server 903 may access the database 905 as needed to perform related operations.

It should be understood that the network environment herein is merely an example. Those skilled in the art may add more devices or remove some devices as needed, and may modify the functions and configurations of some devices.

As shown in FIG. 2, in an exemplary embodiment of the present disclosure, the object evaluation method may include:

Step S100. Obtaining an image of a first object to be evaluated.

The object may include at least one of coins, badges, and tickets. It may be understood that the object may also include other items to be evaluated, which is not limited herein. The image of the first object to be evaluated may be an original image of an object captured by a user, or may be an image obtained after performing processing on the original image of the object, and the image obtained after processing may facilitate further processing subsequently performed by a first object level classifier and the like.

In some embodiments, one or more original images of the first object to be evaluated may be obtained as one or more images of the first object to be evaluated respectively. For example, when the first object to be evaluated is a coin which is an object having patterns on front and back sides, the original image of the first object to be evaluated may include a front captured image or a back captured image, or may include both a front captured image and a back captured image. Further, obtaining the image of the first object to be evaluated may include performing coordinate transformation on the original image of the first object to be evaluated to generate an expanded image of the first object to be evaluated. For example, when the original image of the first object to be evaluated includes the front captured image or the back captured image, the expanded image includes a corresponding front expanded image or back expanded image. Alternatively, when the original image of the first object to be evaluated includes both the front captured image and the back captured image, the expanded image includes both the front expanded image and the back expanded image. Then, the expanded image of the first object to be evaluated may serve as the image of the first object to be evaluated. An outer contour of the image of the first object to be evaluated may be rectangular, because generally computer models obtained based on neural network training can only perform modeling based on rectangular features. If the above transformation is not performed and the original image of the first object to be evaluated is directly used for level evaluation and the like, the evaluation accuracy and reliability will be affected by image angle, quality, and the like. In addition, in some embodiments, a plurality of expanded images for characterizing different parts of the first object to be evaluated may also be merged together for an object level evaluation and the like performed subsequently. For example, two expanded images respectively for characterizing the front and back sides of a coin to be evaluated may be merged together to continue performing evaluation on coin levels.

Figure 4:
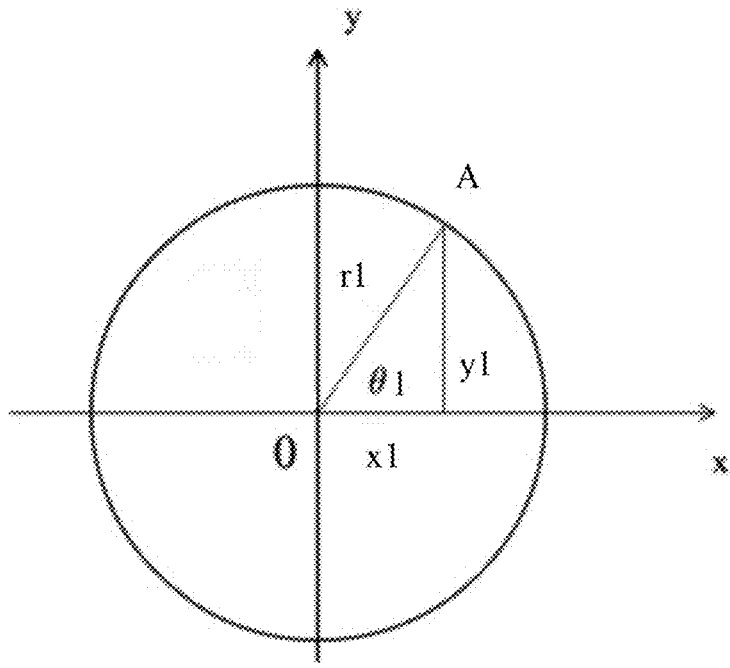
FIG. 4 shows a schematic view of coordinate transformation according to a specific example of the present disclosure.
Figure 5:
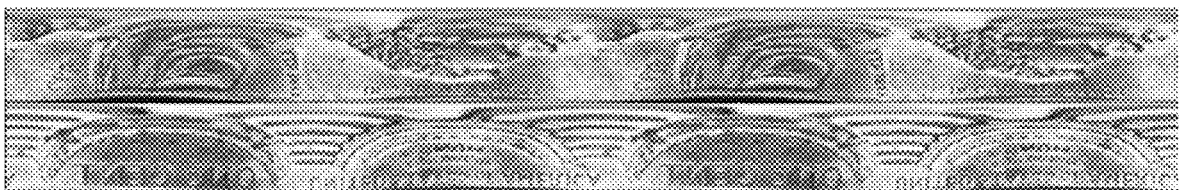
FIG. 5 shows a coin image to be evaluated according to a specific example of the present disclosure.

In a specific example, as shown in FIG. 3, the original image of the coin to be evaluated may include a front captured image and a back captured image of the coin to be evaluated. As shown in FIG. 4, performing the coordinate transformation on the original image of the first object to be evaluated to generate the expanded image of the first object to be evaluated may include performing coordinate transformation based on the following formulas: $x1=r1 \cos \theta1$, $y1=r1 \sin \theta1$, $x1^2+y1^2=r1^2$, $$\frac{y1}{x1} = \tan\theta1,$$

where $(r1, \theta1)$ are polar coordinates of any point A on the original image of the first object to be evaluated before the coordinate transformation, and $(x1, y1)$ are rectangular coordinates of a point A' corresponding to the point A on the expanded image of the first object to be evaluated after the coordinate transformation. When there are a plurality of original images, the above method may be used to perform coordinate transformation on each of the original images respectively to obtain a plurality of corresponding expanded images. In some embodiments, the plurality of expanded images may also be merged together. The coin to be evaluated image obtained through the above coordinate transformation mapping or duplication is shown in FIG. 5, which includes the front expanded image and the back expanded image of the coin to be evaluated, and the overall outer contour of the coin to be evaluated image is also rectangular to facilitate further processing.

Furthermore, in some embodiments, obtaining the image of the first object to be evaluated may further include: performing calibration preprocessing on the original image of the first object to be evaluated before performing the coordinate transformation on the original image of the first object to be evaluated. When there are the plurality of original images, calibration preprocessing may be performed on all original images, or calibration preprocessing may be performed on only part of the original images according to needs, which is not limited herein. Calibration preprocessing is performed considering that users typically introduce some shooting angle deviations when photographing the first object to be evaluated, such as capturing a circular coin as an elliptical shape. Or, in some situations, the image quality of the original image of the first object to be evaluated may be poor. In order to reduce the interference of these factors on the level evaluation of the object, calibration preprocessing may be performed on the original image of the first object to be evaluated before performing the coordinate transformation, for example, by straightening an elliptical coin contour in the image to a standard circular coin contour, or appropriately adjusting the contrast, sharpness, etc. of the original image to help improve the accuracy and reliability of subsequent evaluation.

Returning to FIG. 2, in an exemplary embodiment of the present disclosure, the object evaluation method may further include:

Step S200. Determining first level information according to the image of the first object to be evaluated through a first object level classifier.

The first object level classifier may be directed at an object type of the image of the first object to be evaluated, that is, each object type may have a corresponding first object level classifier. Moreover, the first object level classifier may be obtained based on neural network training, which converts the problem of evaluating objects into a classification problem, where each object level corresponds to a classification category. The output of the first object level classifier may be an N-dimensional vector, where N is the number of possible object levels, and an i-th component in the N-dimensional vector represents a confidence that the object level corresponding to the image of the first object to be evaluated is an i-th object level. In other words, the first level information output by the first object level classifier may include a first rating confidence that the image of the first object to be evaluated is determined as various object levels. In some embodiments, the neural network structures of different first object level classifiers for different object types may be the same, while the specific values of parameters in the neural network structure may be the same or different. Or, in some embodiments, the neural network structures of different first object level classifiers for different object types may also be different. Further, a plurality of first object level classifiers for a plurality of object types may also be integrated together to form a classifier containing M*N categories, where M is the number of possible object types and N is the number of possible object levels.

In some embodiments, the first object level classifier may be trained based on a deep convolutional neural network by utilizing a cross-entropy loss function and a stochastic gradient descent algorithm. It may be understood that other loss functions or algorithms may also be used to train the first object level classifier. During the training process, a training set is typically utilized to train the first object level classifier until a preset accuracy is achieved. In some situations, a test set may also be utilized to test the accuracy of the trained first object level classifier according to need. If the accuracy does not meet requirements, the number of samples in the training set may be increased, and the first object level classifier may be retrained utilizing the updated training set until the accuracy of the trained first object level classifier meets requirements. The completely trained first object level classifier may be deployed to a server for evaluation of object levels.

As described above, it is necessary to select a corresponding first object level classifier according to the object type of the image of the first object to be evaluated to determine the object level of the image of the first object to be evaluated. Here, a plurality of methods may be used to determine the object type of the image of the first object to be evaluated, for example, the object type of the image of the first object to be evaluated may be directly identified manually or through other methods, and the identified object type together with the image of the first object to be evaluated may be input into a computer model to automatically select the corresponding first object level classifier to evaluate the object level of the image of the first object to be evaluated. Or, in some embodiments, the object evaluation method may further include: determining the object type according to the image of the first object to be evaluated through an object type classifier.

Similarly, the object type classifier may be a classifier model obtained based on neural network training. For example, the object type classifier may be trained based on a deep convolutional neural network by utilizing a cross-entropy loss function and a stochastic gradient descent algorithm. It may be understood that other loss functions or algorithms may also be used to train the object type classifier. During the training process, a training set is typically utilized to train the object type classifier until a preset accuracy is achieved. In some situations, a test set may also be utilized to test the accuracy of the trained object type classifier according to need. If the accuracy does not meet requirements, the number of samples in the training set may be increased, and the object type classifier may be retrained utilizing the updated training set until the accuracy of the trained object type classifier meets requirements. The completely trained object type classifier may be deployed to a server for identification of object types. In some embodiments, the object type classifier may also be used to determine a part of the object to be evaluated characterized by the object image to be evaluated, for example, to determine whether the image of the coin to be evaluated characterizes the front side or back side of the coin, etc. In this way, when it is necessary to determine which part of the object to be evaluated is characterized by the object image to be evaluated, the determination may be made through the object type classifier to improve the effect of object level evaluation when needed, as will be described in detail later.

In some embodiments, the object type classifier and various first object level classifiers may also be integrated into one computer model. After the image of the first object to be evaluated is input into the computer model, the object type classifier may first be utilized to determine the object type of the image of the first object to be evaluated, then determine the corresponding first object level classifier according to the object type, and the determined first object level classifier is utilized to determine the object level of the image of the first object to be evaluated.

In some embodiments, when there are a plurality of images of the first object to be evaluated for characterizing different parts of the same first object to be evaluated, the object level may be determined by the first object level classifier according to each of the images of the first object to be evaluated respectively, and the lowest object level among the plurality of object levels of the plurality of images of the first object to be evaluated may serve as the object level of the first object to be evaluated. For example, when the level of the coin to be evaluated is determined to be the MS level according to the front expanded image of the coin to be evaluated, while the level of the coin to be evaluated is determined to be the VG level according to the back expanded image of the coin to be evaluated, then the level of the coin to be evaluated is finally determined to be the VG level.

Returning to FIG. 2, in an exemplary embodiment of the present disclosure, the object evaluation method may further include:

Step S310. Determining adjustment weights of the various object levels according to distribution proportions of object images of the various object levels in a plurality of object images having a same object type as that of the image of the first object to be evaluated and having known object levels; and Step S320. Generating second rating confidences of the various object levels respectively according to the first rating confidences and the adjustment weights of the various object levels to form second level information.

As described above, due to unbalanced data distribution in the training set used to train the first object level classifier, for example, data in the head has a higher proportion compared to data in the tail, in the first object level classifier trained in this way, it may be more possible that the image of the first object to be evaluated is identified as an object level with a higher proportion in the data, for example, it is very likely that the image of the first object to be evaluated is identified as head levels such as the MS level, resulting in poor evaluation accuracy and reliability. To solve the above problem, weight adjustment may be performed on the identified first level information according to data distribution, and the object level of the image of the first object to be evaluated may be determined according to the second level information obtained after adjustment.

The plurality of object images used for calculating distribution proportions may be all object images in the training set used to train the first object level classifier for a certain object type, and the object images have the same object type. Alternatively, the plurality of object images may also be determined by other methods, but they should substantially accurately reflect the data distribution situation in the training set used during the training process. The adjustment weights of the various object levels are determined according to the distribution proportions of the object images of the various object levels in the plurality of object images, so that object levels with a higher distribution proportion have lower adjustment weights, so as to solve the problem of low model accuracy and reliability caused by unbalanced training data distribution in the training set.

When performing weight adjustment on the first level information, the first rating confidences of various object levels may be multiplied by the adjustment weights thereof respectively to generate the second rating confidence of that object level. As described above, since the object levels with a higher distribution proportion have lower adjustment weights, the first rating confidences of the object levels with a higher distribution proportion may be lowered to generate corresponding second rating confidences, while the first rating confidences of the object levels with a lower distribution proportion may be elevated to generate corresponding second rating confidences, thereby at least partially offsetting the impact brought by unbalanced training data distribution in the training set on the output results of the model, thus improving the accuracy and reliability of the first object level classifier.

In a specific example, among the plurality of object images having the same object type as that of the image of the first object to be evaluated and having known object levels, if the distribution proportion of the object image of the i-th object level among the plurality of object images is $p_i$, then an adjustment weight $q_i$ of the i-th object level may be represented as satisfying $q_i = (1/p_i)^a$, where $0 < a < 1$. Here, the parameter a may be adjusted according to the training data distribution in the training set. In a specific example, $a = 0.5$, which statistically may be a robust estimation more biased toward true distribution, thereby enabling the weights to be more accurate. However, it may be understood that in other specific examples, a may have other specific values, or adjustment weights may also be determined based on other expressions to better reflect the distribution situation of different object levels among the plurality of object images.

In a specific example, if there are a total of N object levels, and first object level information is represented as ($c_1$, $c_2$, ..., $c_i$, ..., $c_N$), then second object level information may be represented as ($c_1*p_1$, $c_2*p_2$, ..., $c_i*p_i$, ..., $c_N*p_N$), wherein, $c_i$ is the first rating confidence of the i-th object level, $c_i*p_i$ is the second rating confidence of the i-th object level.

In some embodiments, the object evaluation method may further include taking an object level with the highest second rating confidence as the object level of the image of the first object to be evaluated, that is, the object level of the image of the first object to be evaluated is determined according to the second level information.

Further, when there are a plurality of images of the first object to be evaluated for characterizing different parts of the same first object to be evaluated, the object level may be determined according to each of the images of the first object to be evaluated respectively through the first object level classifier and weight adjustment, and the lowest object level among the plurality of object levels of the plurality of images of the first object to be evaluated may be taken as the object level of the first object to be evaluated. For example, when the level of the coin to be evaluated is determined as the MS level according to the front expanded image of the coin to be evaluated, while the level of the coin to be evaluated is determined as the VG level according to the back expanded image of the coin to be evaluated, then the level of the coin to be evaluated is finally determined as the VG level.

In some situations, since there may be a lack of training data for a specific object level of a specific object type, based on the first object level classifier for that object type, it may always be unable to recognize or determine the evaluation result of the above-mentioned specific object level, which may not correspond to the actual situation. Therefore, in order to further improve the accuracy and reliability of evaluation, a fallback model may also be employed to determine object levels. Specifically, in another exemplary embodiment of the present disclosure, as shown in FIG. 6, the object evaluation method may further include:

Step S410. Comparing the highest second rating confidence in the second level information with a preset rating confidence threshold;

Step S420. When the highest second rating confidence in the second level information is less than the preset rating confidence threshold, determining third level information according to the image of the first object to be evaluated through a second object level classifier.

The second object level classifier is independent of the object type of the image of the first object to be evaluated and is obtained based on neural network training. That is, in the process of training the second object level classifier, all data of all object types may be mixed together, with object images as input samples and object levels as labeled results to train the second object level classifier, regardless of the object types. The second object level classifier obtained through such training may be used for evaluation of object images of various object types without having to consider the object type itself, which helps to increase training based on tail data during the training process, therefore the second object level classifier may be used for fallback evaluation.

Similarly, the second object level classifier may be trained based on a deep convolutional neural network by utilizing a cross-entropy loss function and a stochastic gradient descent algorithm. It may be understood that other loss functions or algorithms may also be used to train the second object level classifier. During the training process, a training set is typically utilized to train the second object level classifier until a preset accuracy is achieved. In some situations, a test set may also be utilized as needed to test the accuracy of the trained second object level classifier. If the accuracy does not meet requirements, the number of samples in the training set may be increased, and the updated training set may be utilized to retrain the second object level classifier until the accuracy of the trained second object level classifier meets requirements. The completely trained second object level classifier may be deployed to a server for fallback evaluation of object levels, thereby outputting third level information, where the third level information includes third rating confidence that the image of the first object to be evaluated is determined as various object levels.

In some embodiments, each of the first object level classifiers for each of the object types and the second object level classifier may have the same neural network structure. However, because the training sets are different, the specific values of parameters in the neural network structure are typically different. Nevertheless, it may be understood that in some other embodiments, each of the first object level classifiers for each of the object types and the second object level classifier may also have different neural network structures to determine more suitable neural network structures for corresponding training purposes, thereby improving the accuracy and reliability of the trained models.

Further, the object evaluation method may also include taking the object level with the highest third rating confidence as the object level of the image of the first object to be evaluated. That is, in the situation where the highest second rating confidence in the second level information is less than the preset rating confidence threshold, the object level of the image of the first object to be evaluated will be finally determined according to the third level information output by the second object level classifier used for fallback evaluation. It may be understood that if the highest second rating confidence in the second level information is greater than or equal to the preset rating confidence threshold, the object level of the image of the first object to be evaluated may still be finally determined according to the second level information obtained after weight adjustment.

Similarly, when there are the plurality of images of the first object to be evaluated for characterizing the different parts of the same first object to be evaluated, the object level may be determined according to each of the images of the first object to be evaluated respectively through the second object level classifier, and the lowest object level among the plurality of object levels of the plurality of images of the first object to be evaluated may be taken as the object level of the first object to be evaluated. For example, when the level of the coin to be evaluated is determined to be the MS level according to the front expanded image of the coin to be evaluated, while the level of the coin to be evaluated is determined to be the VG level according to the back expanded image of the coin to be evaluated, then the level of the coin to be evaluated is finally determined to be the VG level.

To further improve the accuracy and reliability of evaluation, the object level of the image of the second object to be evaluated may be finally determined by comparing the image of the second object to be evaluated with a reference object image having a relatively accurate object level. In some situations, the reference object image may be taken as the image of the first object to be evaluated, and the method described above may be utilized to determine the object level of the reference object image. Specifically, when determining the object level of the reference object image, the first level information may be determined through the first object level classifier according to the reference object image. Adjustment weights of the various object levels may be determined according to the distribution proportions of the object images of the various object levels in the plurality of object images having the same object type as that of the reference object image and having known object levels. Second rating confidence for each of the object levels may be generated respectively according to the first rating confidences and adjustment weights of the various object levels to form the second level information. If the highest second rating confidence in the second level information is greater than or equal to the preset rating confidence threshold, the object level with the highest second rating confidence may be taken as the object level of the reference object image. If the highest second rating confidence in the second level information is less than the preset rating confidence threshold, third level information may be determined through the second object level classifier according to the reference object image, and the object level with the highest third rating confidence may be taken as the object level of the reference object image. Further, in yet another exemplary embodiment of the present disclosure, as shown in FIG. 7, the object evaluation method may also include:

Step S510. Obtaining an image of a second object to be evaluated, and obtaining a reference object image according to the image of the second object to be evaluated.

The object type of the reference object image is the same as the object type of the image of the second object to be evaluated, and the reference object image serves as the image of the first object to be evaluated to determine an object level of a reference object. That is, the object level of the reference object may be obtained according to the embodiment shown in FIG. 2 or FIG. 6. In some embodiments, the reference object image may be randomly obtained from a preset reference image set having the object type of the image of the second object to be evaluated. Furthermore, the reference object image is normally a relatively standard image, so the object level thereof may be accurately determined according to the method described above, and thus may serve as a benchmark to improve the accuracy and reliability of evaluating the object level of the image of the second object to be evaluated.

In some embodiments, the method as described above may be used to similarly process an original image of the second object to be evaluated to generate the image of the corresponding second object to be evaluated, which will not be described in detail here. Further, the obtained one or more reference object images may correspond to the one or more images of the second object to be evaluated one by one. For example, when the image of the second object to be evaluated only includes the front expanded image or the back expanded image of the coin, the reference object image is the corresponding front expanded image or back expanded image of the same type of coin. Alternatively, when the image of the second object to be evaluated includes both the front expanded image and the back expanded image of the coin, the reference object image is both the front expanded image and the back expanded image of the same type of coin. As described above, the object type classifier may also be used to determine a part of the object to be evaluated characterized by the object image to be evaluated. For example, the object type classifier may be used to determine whether the image of the coin to be evaluated characterizes the front side or back side of the coin, etc. Thus, when it is necessary to determine which part of the object to be evaluated is characterized by the image of the object to be evaluated, the determination may be made through the object type classifier. Then the reference object image may be selected accordingly, so that the part of the reference object characterized by the reference object image and the part of the object to be evaluated characterized by the object image to be evaluated are the same part of the same object type, so as to improve the effect of object level evaluation when needed. Therefore, while determining the object type of the image of the second object to be evaluated through the object type classifier, a part of the second object to be evaluated characterized by the image of the second object to be evaluated may also be determined, and the corresponding reference object image may be randomly selected accordingly from the corresponding reference image set. For example, when the object type classifier determines that the coin image to be evaluated characterizes the front side of the coin, a reference coin image characterizing the front side of the same type of coin is selected accordingly. When the object type classifier determines that the coin image to be evaluated characterizes the back side of the coin, a reference coin image characterizing the back side of the same type of coin is selected accordingly. When the object type classifier determines that the coin images to be evaluated respectively characterize the front side and back side of the coin, reference coin images characterizing the front side and back side of the same type of coin are selected accordingly. The number of selected reference object images may be consistent with the number of the images of the second object to be evaluated provided by the user; or the number of selected reference object images may be more than the number of the images of the second object to be evaluated provided by the user. That is, a plurality of reference object images may be selected for the same image of the second object to be evaluated, as will be described in detail later.

Returning to FIG. 7, in an exemplary embodiment of the present disclosure, the object evaluation method may further include:

Step S520. Obtaining a second image feature to be evaluated corresponding to the image of the second object to be evaluated and a reference image feature corresponding to the reference object image respectively according to the image of the second object to be evaluated and the reference object image through the first object level classifier.

The second image feature to be evaluated and the reference image feature respectively reflect the features used to determine the object levels of the image of the second object to be evaluated and the reference object image. In order to facilitate the calculation of a feature distance between the second image feature to be evaluated and the reference image feature, and since both the second image feature to be evaluated and the reference image feature are obtained through the first object level classifier, dimensions of the second image feature to be evaluated and the reference image feature are the same. In a specific example, the second image feature to be evaluated and the reference image feature are 512-dimensional feature vectors respectively.

Returning to FIG. 7, in an exemplary embodiment of the present disclosure, the object evaluation method may further include:

Step S530. Calculating the feature distance between the second image feature to be evaluated and the reference image feature.

Specifically, the feature distance between the second image feature to be evaluated and the reference image feature may be defined or calculated in plurality of methods. In some embodiments, calculating the feature distance between the second image feature to be evaluated and the reference image feature may include: encoding the second image feature to be evaluated and the reference image feature through two fully connected layers, and using an output result obtained from the encoding as the feature distance. In other embodiments, calculating the feature distance between the second image feature to be evaluated and the reference image feature may include: calculating the feature distance between the second image feature to be evaluated and the reference image feature through a similarity measurement algorithm. Here, the feature distance between the second image feature to be evaluated and the reference image feature may be an Euclidean distance, a cosine distance, or an Earth Mover's Distance (EMD), etc.

Further, the object evaluation method may include:

Step S540. Determining the object level of the image of the second object to be evaluated according to the feature distance and the object level of the reference object image.

Here, the smaller the feature distance is, the closer the object level of the image of the second object to be evaluated is to the object level of the reference object image, or even the same as that of the reference object image. For example, when the feature distance is a first feature distance, a level difference between the object level of the image of the second object to be evaluated and the object level of the reference object image is a first level difference. When the feature distance is a second feature distance, a level difference between the object level of the image of the second object to be evaluated and the object level of the reference object image is a second level difference. When the first feature distance is greater than the second feature distance, the first level difference is greater than or equal to the second level difference.

A plurality of methods may be adopted to define a mapping relationship between the feature distance and the level difference of the object level, so that the object level determined according to the object evaluation method shown in FIG. 7 is more accurate and reliable. In a specific example, when a cosine distance is used as the feature distance between the second image feature to be evaluated and the reference image feature, a value range of the cosine distance is 0~1, then the mapping relationship between the feature distance and the level difference of the object level may be defined with 0.1 as the level difference. If the object level of the reference object image is the MS level, then the method for determining the object level of the image of the second object to be evaluated according to the cosine distance is specifically as follows:

If the cosine distance d satisfies $0 \le d < 0.1$, then the level difference is 0, and the object level of the image of the second object to be evaluated is also the MS level;

If the cosine distance d satisfies $0.1 \le d < 0.2$, then the level difference is 1, and the object level of the image of the second object to be evaluated is the AU level;

If the cosine distance d satisfies $0.2 \le d < 0.3$, then the level difference is 2, and the object level of the image of the second object to be evaluated is the XF level;

If the cosine distance d satisfies $0.3 \le d < 0.4$, then the level difference is 3, and the object level of the image of the second object to be evaluated is the VF level;

If the cosine distance d satisfies $0.4 \le d < 0.5$, then the level difference is 4, and the object level of the image of the second object to be evaluated is the F level;

If the cosine distance d satisfies $0.5 \le d < 0.6$, then the level difference is 5, and the object level of the image of the second object to be evaluated is the VG level;

If the cosine distance d satisfies $0.6 \le d < 0.7$, then the level difference is 6, and the object level of the image of the second object to be evaluated is the AG level;

If the cosine distance d satisfies $0.7 \le d < 0.8$, then the level difference is 7, and the object level of the image of the second object to be evaluated is the FA level;

If the cosine distance d satisfies $0.8 \le d < 0.9$, then the level difference is 8, and the object level of the image of the second object to be evaluated is the P level.

It may be understood that, when there are a plurality of images of the second object to be evaluated for characterizing different parts of the same second object to be evaluated, corresponding reference object image may be obtained according to each of the images of the second object to be evaluated respectively, so as to determine the object level of the second object to be evaluated based on the method shown in FIG. 7.

Specifically, when there are the plurality of images of the second object to be evaluated for characterizing different parts of the same second object to be evaluated, one or more corresponding reference object images may be obtained according to each of the images of the second object to be evaluated respectively. Then, all the obtained reference object images may be divided into one or more reference object image groups, wherein the reference object images in each of the reference object image groups are used to characterize the same reference object, and the reference object images in different reference object image groups are used to characterize different reference objects respectively. That is, the reference object images used to characterize the same reference object are divided into the same reference object image group. Then, the following operations may be performed on each of the reference object image groups: each of the reference object images in the reference object image group respectively serves as the image of the first object to be evaluated to determine the object level of that reference object image, and the lowest object level of all reference object images in the reference object image group serves as the object level of the reference object characterized by the reference object image group. That is, when the obtained plurality of reference object images corresponding to the plurality of images of the second object to be evaluated are used to characterize the same reference object, the plurality of reference object images may be utilized to determine the object level of this one reference object. When determining the object level of each of the reference object images, the method shown in FIG. 2 or FIG. 6 may be adopted. That is, for each of the reference object images, the first level information may be determined according to the reference object image through the first object level classifier. Adjustment weights of the various object levels may be determined according to the distribution proportions of the object images of the various object levels in the plurality of object images having the same object type as that of the reference object image and having known object levels.

Second rating confidences for the various object levels may be generated according to the first rating confidences and the adjustment weights of the various object levels respectively to form second level information. If the highest second rating confidence in the second level information is greater than or equal to a preset rating confidence threshold, the object level having the highest second rating confidence serves as the object level of the reference object image. If the highest second rating confidence in the second level information is less than the preset rating confidence threshold, third level information is determined according to the reference object image through the second object level classifier, and the object level having the highest third rating confidence serves as the object level of the reference object image. Further, the feature distance between the reference image feature of each of the reference object images in the reference object image group and the second image feature to be evaluated of the image of the corresponding second object to be evaluated may be obtained respectively, and the object level of the image of the second object to be evaluated may be determined according to an average feature distance of all feature distances of the reference object image group and the object level of the reference object characterized by the reference object image group. Under the circumstances, one object level of the image of the second object to be evaluated is determined according to one reference object image group. Finally, the average object level of one or more object levels determined according to the one or more reference object image groups may finally serve as the object level of the second object to be evaluated. As described above, when determining the average object level, the various object levels may be converted to corresponding values, and the average value of these values may be calculated. If the calculated average value is an integer, the integer may be directly converted to the corresponding average object level, otherwise the average value may be rounded, for example, and the corresponding average object level may be determined according to the rounded average value.

For example, when there are a front expanded image and a back expanded image for characterizing the same coin to be evaluated, for the front expanded image of the coin to be evaluated, a front expanded image of a first reference coin and a front expanded image of a second reference coin may be randomly selected as corresponding two reference object images. For the back expanded image of the coin to be evaluated, a back expanded image of the first reference coin may be randomly selected as a corresponding one reference object image, wherein the first reference coin and the second reference coin are two different reference coins, and the coin to be evaluated, the first reference coin and the second reference coin have the same type. Further, the front expanded image of the first reference coin and the back expanded image of the first reference coin may be divided into a first reference object image group, while the front expanded image of the second reference coin may be divided into a second reference object image group. For the first reference object image group, the front expanded image of the first reference coin and the back expanded image of the first reference coin may respectively serve as the image of the first object to be evaluated, and the method described above may be adopted to determine the corresponding coin level. Assuming that the coin level determined according to the front expanded image of the first reference coin is the MS level, while the coin level determined according to the back expanded image of the first reference coin is the AU level, then the lower AU level among the levels may serve as the coin level of the first reference coin. Further, a first feature distance between the image feature of the front expanded image of the first reference coin and the image feature of the front expanded image of the coin to be evaluated and a second feature distance between the image feature of the back expanded image of the first reference coin and the image feature of the back expanded image of the coin to be evaluated may be calculated through the first object level classifier combined with the feature distance. Assuming that the first feature distance is 0 and the second feature distance is 0.22, then the average feature distance of the first feature distance and the second feature distance may be determined as 0.11. Further, the coin level of the coin to be evaluated may be determined as the XF level according to the average feature distance 0.11 and the AU level as the coin level of the first reference coin. Similarly, for the second reference object image group, the front expanded image of the second reference coin may serve as the image of the first object to be evaluated, and the method described above may be adopted to determine the corresponding coin level. Assuming that the coin level determined according to the front expanded image of the second reference coin is the MS level, then the MS level may directly serve as the coin level of the second reference coin. Further, a third feature distance between an image feature of the front expanded image of the second reference coin and an image feature of the front expanded image of the coin to be evaluated may be calculated through the first object level classifier combined with the feature distance. Assuming that the third feature distance is 0.02, then an average feature distance of the second reference object image group is also 0.02, and combined with the MS level as the coin level of the second reference coin, the coin level of the coin to be evaluated may be determined as the MS level. Finally, an average level of the XF level (corresponding to the value 8) determined according to the first reference object image group and the MS level (corresponding to the value 10) determined according to the second reference object image group serves as a final level of the coin to be evaluated, and the average value of 8 and 10 is 9, which corresponds to the AU level. It may be understood that in another specific example, if the coin levels determined according to three reference object image groups are the AU level (corresponding to the value of 9), the MS level (corresponding to the value of 10) and the AU level respectively, then an average value of the corresponding values of these three coin levels is approximately 9.33, which becomes 9 after rounding, therefore the level of the coin to be evaluated may be finally determined as the AU level.

As described above, in order to further improve the accuracy and reliability of evaluation, for the same image of the second object to be evaluated, the object level of the image of the second object to be evaluated may be determined based on the plurality of object levels respectively determined according to the plurality of reference object images. That is to say, for the same image of the second object to be evaluated, steps S510 to S540 may be repeated for a plurality of times to obtain the plurality of object levels of the image of the second object to be evaluated, and then the object level of the image of the second object to be evaluated may be finally determined according to the plurality of object levels. In a specific example, the average level based on the plurality of object levels respectively determined according to the plurality of reference object images may serve as the object level of image of the second object to be evaluated. Similarly, when determining the average level of the plurality of object levels, the various object levels may be converted to corresponding values, and an average value of the values may be calculated. If the calculated average value is an integer, the integer may be directly converted to the corresponding average level, otherwise the average value may be obtained through rounding, for example, and the corresponding average level may be determined according to the rounded average value.

Additionally, the present disclosure also provides an object evaluation device 800, as shown in FIG. 8, the object evaluation device may include a memory 820 and a processor 810, and instructions are stored in the memory 820. When the instructions are executed by the processor 810, the object evaluation method as described above is implemented.

The processor 810 may execute various actions and processing according to instructions stored in the memory 820. Specifically, the processor 810 may be an integrated circuit chip having signal processing capability. The processor may be a general-purpose processor, a digital signal processor (DSP), an application-specific integrated circuit (ASIC), a field-programmable gate array (FPGA) or other programmable logic devices, discrete gates or transistor logic devices, and discrete hardware components. Various methods, steps and logic block diagrams disclosed in the embodiments of the present disclosure may be implemented or executed. The general-purpose processor may be a microprocessor or the processor may also be any conventional processor, and so on, and may be an X86 architecture or an ARM architecture, etc.

The memory 820 stores executable instructions, and the instructions execute the object evaluation method described above when executed by the processor 810. The memory 820 may be a volatile memory or a non-volatile memory, or may include both the volatile memory and the non-volatile memory. The non-volatile memory may be a read-only memory (ROM), a programmable read-only memory (PROM), an erasable programmable read-only memory (EPROM), an electrically erasable programmable read-only memory (EEPROM) or a flash memory. The volatile memory may be a random access memory (RAM), which serves as external cache. By way of exemplary but not restrictive illustration, many forms of RAM are available, such as a static random access memory (SRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a synchlink dynamic random access memory (SLDRAM) and a direct rambus random access memory (DR RAM). It should be noted that the memory for the methods described herein is intended to include but not be limited to these and any other suitable types of memory.

The present disclosure also provides a computer-readable storage medium, and instructions are stored in the computer-readable storage medium. When the instructions are executed by a processor, the object evaluation method as described above is implemented.

Similarly, the computer-readable storage medium in the embodiments of the present disclosure may be a volatile memory or a non-volatile memory, or may include both the volatile memory and the non-volatile memory. It should be noted that the computer-readable storage medium described herein is intended to include but not be limited to these and any other suitable types of memory.

The present disclosure further provides a computer program product. The computer program product may include instructions. When the instructions are executed by a processor, the object evaluation method as described above is implemented.

The instructions may be any instruction set to be executed directly by one or more processors, such as machine codes, or any instruction set to be executed indirectly, such as scripts. The terms "instructions", "applications", "processes", "steps" and "programs" may be used interchangeably herein. The instructions may be stored in an object code format for direct processing by one or more processors, or stored as any other computer language, including scripts or collections of independent source code modules that are interpreted on demand or compiled in advance. The instructions may include instructions that make one or more processors to serve as various neural networks herein. Other parts herein explain the functions, methods and routines of the instructions in further details.

It should be noted that the flowcharts and block diagrams in the drawings illustrate the architecture, functionality, and operation of possible implementations of systems, methods and computer program products according to various embodiments of the present disclosure. In this regard, each block in the flowchart or block diagrams may represent a module, a program segment, or a part of codes, which contains one or more executable instructions for implementing the specified logical function. It should also be noted that, in some alternative implementations, the functions noted in the block may occur differently from the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowcharts, and combinations of blocks in the block diagrams and/or flowcharts, may be implemented by a specific-purpose hardware-based systems that perform the specified functions or operations, or may be implemented by combinations of the specific-purpose hardware and computer instructions.

Generally, various example embodiments of the present disclosure may be implemented in hardware or specific-purpose circuits, software, firmware, logic, or any combination thereof. Some aspects may be implemented in hardware, while other aspects may be implemented in firmware or software that may be executed by a controller, a microprocessor or other computing devices. When various aspects of embodiments of the present disclosure are illustrated or described as block diagrams, flowcharts, or denoted by some other graphical diagrams, it will be understood that the blocks, apparatus, systems, techniques or methods described herein may be implemented, as non-limiting examples, in hardware, software, firmware, specific-purpose circuits or logic, general-purpose hardware or controller or other computing devices, or some combination thereof.

The words "front", "rear", "top", "bottom", "above", "below", and similar terms, if used in the specification and claims, are for descriptive purposes and are not necessarily used to describe permanent relative positions. It should be understood that the words so used are interchangeable under appropriate circumstances such that the embodiments of the present disclosure described herein are, for example, capable of operating in other orientations different from those illustrated or otherwise described herein.

As used herein, the word "exemplary" means "serving as an example, instance, or illustration" rather than as a "model" to be precisely replicated. Any implementation described herein as exemplary is not necessarily to be construed as preferred or advantageous over other implementations. Moreover, the present disclosure is not limited by any expressed or implied theory presented in the aforementioned technical field, background, summary, or detailed description.

As used herein, the word "substantially" means including any minor variations due to design or manufacturing defects, tolerances of devices or components, environmental influences and/or other factors. The word "substantially" also allows for differences from the perfect or ideal situation due to parasitic effects, noise, and other practical considerations that may be present in actual implementations.

Additionally, the foregoing description may have referred to elements or nodes or features being "connected" or "coupled" together. As used herein, unless expressly stated otherwise, "connected" means that one element/node/feature is directly connected (or directly communicates) with another element/node/feature electrically, mechanically, logically or otherwise. Similarly, unless expressly stated otherwise, "coupled" means that one element/node/feature may be joined with another element/node/feature mechanically, electrically, logically or otherwise in a direct or indirect manner to allow interaction, even though the two features may not be directly connected. That is, "coupled" is intended to encompass both direct and indirect connections of elements or other features, including connections utilizing one or more intermediate elements.

Additionally, terms such as "first", "second" and the like may also be used herein for reference purposes only, and thus are not intended to be limiting. For example, unless the context clearly indicates otherwise, the words "first", "second" and other such numerical terms referring to structures or elements do not imply a sequence or order.

It should also be understood that the word "include/comprise" when used herein specifies the presence of stated features, integers, steps, operations, units and/or components, but does not preclude the presence or addition of one or more other features, integers, steps, operations, units and/or components and/or combinations thereof.

In the present disclosure, the term "provide" is used broadly to encompass all ways of obtaining an object, thus "providing an object" includes but is not limited to "purchasing", "preparing/manufacturing", "arranging/setting", "installing/assembling", and/or "ordering" the object, etc.

While some specific embodiments of the present disclosure have been described in detail through examples, those skilled in the art should understand that the above examples are for illustration only and are not intended to limit the scope of the present disclosure. The various embodiments disclosed herein may be combined in any manner without departing from the spirit and scope of the present disclosure. Those skilled in the art should also understand that various modifications may be made to the embodiments without departing from the scope and spirit of the present disclosure. The scope of the present disclosure is defined by the appended claims.

What is claimed is:

1. An object evaluation method, wherein the object evaluation method comprises:

obtaining an image of a first object to be evaluated;

determining first level information by means of a first object level classifier according to the image of the first object to be evaluated, wherein the first object level classifier is directed at an object type of the image of the first object to be evaluated and is obtained based on neural network training, and the first level information comprises a first rating confidence that the image of the first object to be evaluated is determined as various object levels;

determining adjustment weights of the various object levels according to distribution proportions of object images of the various object levels in a plurality of object images having a same object type as that of the image of the first object to be evaluated and having known object levels, wherein an object level having a high distribution proportion has a low adjustment weight; and generating second rating confidences of the various object levels respectively according to first rating confidences and the adjustment weights of the various object levels to form second level information.

2. The object evaluation method according to claim 1, wherein obtaining the image of the first object to be evaluated comprises:

obtaining an original image of the first object to be evaluated; and performing coordinate transformation on the original image of the first object to be evaluated to generate an expanded image of the first object to be evaluated, and using the expanded image as the image of the first object to be evaluated, wherein an outer contour of the image of the first object to be evaluated is rectangular.

3. The object evaluation method according to claim 2, wherein performing the coordinate transformation on the original image of the first object to be evaluated to generate the expanded image of the first object to be evaluated comprises performing the coordinate transformation based on following formula:

$$x1 = r1\cos\theta1,$$
$$y1 = r1\sin\theta1,$$
$$x1^2 + y1^2 = r1^2,$$
$$\frac{y1}{x1} = \tan\theta1,$$

wherein, $(r1, \theta1)$ are polar coordinates of any point A on the original image of the first object to be evaluated before the coordinate transformation, $(x1, y1)$ are rectangular coordinates of a point A' corresponding to the point A on the expanded image of the first object to be evaluated after the coordinate transformation.

4. The object evaluation method according to claim 1, wherein among the plurality of object images having the same object type as that of the image of the first object to be evaluated and having the known object levels, if a distribution proportion of an object image of an i-th object level among the plurality of object images is pi, then an adjustment weight qi of the i-th object level satisfies $qi=(1/pi)^a$, wherein, $0<a<1$.

5. The object evaluation method according to claim 4, wherein the a is set to 0.5.

6. The object evaluation method according to claim 1, wherein if there are a total of N object levels, and first object level information is represented as (c1, c2, . . . , ci, . . . , cN), then second object level information is represented as (c1\*p1, c2\*p2, . . . , ci\*pi, . . . , cN\*pN), wherein, ci is a first rating confidence of an i-th object level, ci\*pi is a second rating confidence of the i-th object level.

7. The object evaluation method according to claim 1, further comprising:

taking an object level having a highest second rating confidence as an object level of the image of the first object to be evaluated.

8. The object evaluation method according to claim 7, wherein when there are a plurality of images of the first object to be evaluated for characterizing different parts of the same first object to be evaluated, the object level of the image of the first object to be evaluated is determined according to each of the plurality of images of the first object to be evaluated respectively; and the object evaluation method further comprises:

taking a lowest object level among a plurality of object levels of the plurality of images of the first object to be evaluated as the object level of the first object to be evaluated.

9. The object evaluation method according to claim 1, further comprising:

comparing a highest second rating confidence in the second level information with a preset rating confidence threshold;

when the highest second rating confidence in the second level information is less than the preset rating confidence threshold, third level information is determined according to the image of the first object to be evaluated through a second object level classifier, wherein the second object level classifier is independent of the object type of the image of the first object to be evaluated and is obtained based on the neural network training, and the third level information comprises a third rating confidence that the image of the first object to be evaluated is determined as the various object levels.

10. The object evaluation method according to claim 9, further comprising:

taking an object level having a highest third rating confidence as an object level of the image of the first object to be evaluated.

11. The object evaluation method according to claim 1, further comprising:

obtaining an image of a second object to be evaluated, and obtaining a reference object image according to the image of the second object to be evaluated, wherein an object type of the reference object image is the same as an object type of the image of the second object to be evaluated, and the reference object image is taken as the image of the first object to be evaluated to determine an object level of a reference object;

obtaining a second image feature to be evaluated corresponding to the image of the second object to be evaluated and a reference image feature corresponding to the reference object image according to the image of the second object to be evaluated and the reference object image respectively through the first object level classifier;

calculating a feature distance between the second image feature to be evaluated and the reference image feature; and determining an object level of the image of the second object to be evaluated according to the feature distance and the object level of the reference object.

12. The object evaluation method according to claim 11, wherein a part of a second object to be evaluated characterized by the image of the second object to be evaluated is determined through an object type classifier, and a part of the reference object characterized by the reference object image is the same as the part of the second object to be evaluated characterized by the image of the second object to be evaluated.

13. The object evaluation method according to claim 11, wherein the reference object image is randomly obtained from a preset reference image set having the object type of the image of the second object to be evaluated.

14. The object evaluation method according to claim 11, wherein when there are a plurality of images of the second object to be evaluated for characterizing different parts of the same second object to be evaluated, one or more corresponding reference object images are obtained according to each of the plurality of images of the second object to be evaluated respectively;

dividing all the obtained reference object images into one or more reference object image groups, wherein the reference object images in each of the reference object image groups are used to characterize the same reference object, and the reference object images in different reference object image groups are respectively used to characterize different reference objects;

performing following operations on each of the reference object image groups:

using each of the reference object images in the reference object image group as the image of the first object to be evaluated respectively to determine an object level of the reference object image, and using a lowest object level of all the reference object images in the reference object image group as the object level of the reference object characterized by the reference object image group;

obtaining a feature distance between the reference image feature of each of the reference object images in the reference object image group and the second image feature to be evaluated of the image of the corresponding second object to be evaluated;

determining the object level of the image of the second object to be evaluated according to an average feature distance of all feature distances of the reference object image group and the object level of the reference object characterized by the reference object image group; and using an average object level of one or more object levels determined according to the one or more reference object image groups as an object level of the second object to be evaluated.

15. The object evaluation method according to claim 11, wherein calculating the feature distance between the second image feature to be evaluated and the reference image feature comprises:

encoding the second image feature to be evaluated and the reference image feature through two fully connected layers, and using an output result obtained from the encoding as the feature distance.

16. The object evaluation method according to claim 11, wherein calculating the feature distance between the second image feature to be evaluated and the reference image feature comprises:

calculating the feature distance between the second image feature to be evaluated and the reference image feature through a similarity measurement algorithm.

17. The object evaluation method according to claim 11, wherein when the feature distance is a first feature distance, a level difference between the object level of the image of the second object to be evaluated and an object level of the reference object image is a first level difference, when the feature distance is a second feature distance, the level difference between the object level of the image of the second object to be evaluated and the object level of the reference object image is a second level difference, when the first feature distance is greater than the second feature distance, the first level difference is greater than or equal to the second level difference.

18. The object evaluation method according to claim 11, further comprising:

for the image of the same second object to be evaluated, determining the object level of the image of the second object to be evaluated based on a plurality of object levels respectively determined according to a plurality of reference object images.

19. The object evaluation method according to claim 18, wherein an average level based on the plurality of object levels respectively determined according to the plurality of reference object images is used as the object level of the image of the second object to be evaluated.

20. An object evaluation device, wherein the object evaluation device comprises a memory and a processor, wherein instructions are stored in the memory, and when the instructions are executed by the processor, the object evaluation method according to claim 1 is implemented.

21. A non-transitory computer-readable storage medium storing instructions that, when executed by a processor, cause the processor to implement the object evaluation method according to claim 1.

\* \* \* \* \*